US011192145B2

(12) United States Patent
Sturm et al.

(10) Patent No.: US 11,192,145 B2
(45) Date of Patent: Dec. 7, 2021

(54) SINGULATING SYSTEM FOR PARCELS

(71) Applicant: Material Handling Systems, Inc., Mount Washington, KY (US)

(72) Inventors: Gregory Robert Sturm, Simpsonville, KY (US); Jonathan Dean Terrell, Louisville, KY (US); Thomas Anthony Hillerich, Jr., Louisville, KY (US); Michael Alan McCue, Louisville, KY (US); David W. Caldwell, II, Louisville, KY (US); Derek Robert Sturm, Louisville, KY (US)

(73) Assignee: Material Handling Systems, Inc., Mt. Washington, KY (US)

( * ) Notice: Subject to any disclaimer, the term of this patent is extended or adjusted under 35 U.S.C. 154(b) by 245 days.

(21) Appl. No.: 16/590,812

(22) Filed: Oct. 2, 2019

(65) Prior Publication Data

US 2020/0108414 A1 Apr. 9, 2020

Related U.S. Application Data

(60) Provisional application No. 62/740,612, filed on Oct. 3, 2018.

(51) Int. Cl.
*B65G 39/18* (2006.01)
*B07C 5/342* (2006.01)
(Continued)

(52) U.S. Cl.
CPC .......... *B07C 5/3422* (2013.01); *B07C 5/3404* (2013.01); *B07C 5/362* (2013.01); *B65G 39/18* (2013.01)

(58) Field of Classification Search
CPC ...... B65G 39/18; B65G 47/71; B07C 5/3422; B07C 5/3404; B07C 5/362; B07C 5/02; B07C 1/04
See application file for complete search history.

(56) References Cited

U.S. PATENT DOCUMENTS

| 4,264,002 A | * | 4/1981 | Van Der Schie | ...... B65G 13/08 |
| | | | | 198/361 |
| 5,333,722 A | * | 8/1994 | Ouellette | ............... B65G 13/10 |
| | | | | 198/436 |

(Continued)

FOREIGN PATENT DOCUMENTS

| KR | 10-2018-0086742 A | 8/2018 |
| WO | 2016-108937 A1 | 7/2016 |

OTHER PUBLICATIONS

Korean Intellectual Property Office, International Search Report issued in corresponding Application No. PCT/US2019/054251 dated Jan. 22, 2020.

*Primary Examiner* — Patrick H MacKey
(74) *Attorney, Agent, or Firm* — Stites & Harbison, PLLC; David W. Nagle, Jr.

(57) ABSTRACT

A singulating system for parcels comprises: an inner wall; a first section comprised of a series of driven rollers, which are skewed relative to a longitudinal direction of travel, so that the parcels are conveyed not only in the longitudinal direction of travel, but also toward the inner wall; a second section for receiving the parcels from the first section, and then identifying and moving parcels in a side-by-side arrangement and/or parcels with an irregular shape; and a third section for receiving the parcels from the second section. In some embodiments, the singulating system also includes a visioning subsystem, including a camera for acquiring image data of the parcels as the parcels move toward or into the second section, and a computer to receive and analyze the image data from the camera to identify parcels in a side-by-side arrangement and/or parcels with an irregular shape.

20 Claims, 14 Drawing Sheets

(51) Int. Cl.
*B07C 5/34* (2006.01)
*B07C 5/36* (2006.01)

(56) References Cited

U.S. PATENT DOCUMENTS

| | | | |
|---|---|---|---|
| 5,701,989 A * | 12/1997 | Boone | B65G 47/682 |
| | | | 198/443 |
| 6,401,936 B1 | 6/2002 | Isaacs et al. | |
| 7,191,894 B2 * | 3/2007 | Costanzo | B65G 47/26 |
| | | | 198/457.05 |
| 9,533,836 B2 * | 1/2017 | Cristoforetti | B65G 47/682 |
| 2016/0176653 A1 | 6/2016 | Grant et al. | |
| 2017/0120300 A1 | 5/2017 | Schroader | |
| 2018/0215552 A1 * | 8/2018 | Kim | B65G 37/00 |
| 2018/0345324 A1 | 12/2018 | Hillerich, Jr. et al. | |

\* cited by examiner

SINGULATING SYSTEM FOR PARCELS

CROSS-REFERENCE TO RELATED APPLICATIONS

The present application claims priority to U.S. Patent Application Ser. No. 62/740,612 filed on Oct. 3, 2018, the entire disclosure of which is incorporated herein by reference.

BACKGROUND OF THE INVENTION

The present invention relates to the handling of parcels within a sorting or similar facility. In a sorting facility for parcels, parcels are unloaded from trucks or other vehicles at unloading locations, sorted, and then loaded onto trucks or other vehicles at loading locations for delivery to the intended recipients. Thus, within the sorting facility, there is often a complex system of conveyors and equipment that facilitates transport and sorting of the parcels within the facility.

When first introduced into the system of conveyors and equipment, the parcels are randomly positioned on a conveyor in a "bulk flow." Thus, within the sorting facility, the first step is often to transform the bulk flow into a singulated flow of parcels in which the parcels are positioned at substantially equal intervals and aligned (i.e., in a single file line) along a conveyor for subsequent processing. A wide variety of singulators or singulating systems exist in the art. However, there are certain deficiencies in such prior art systems, particularly with respect to handling parcels that are being conveyed in a side-by-side arrangement or parcels with an irregular shape.

Accordingly, there remains a need for improvements in singulating systems for effectively transitioning parcels from a bulk flow into a singulated stream of parcels.

SUMMARY OF THE INVENTION

The present invention is a singulating system for parcels with a visioning subsystem that identifies parcels that are being conveyed in a side-by-side arrangement and/or parcels with an irregular shape.

An exemplary singulating system for parcels made in accordance with the present invention includes a first section comprised of a series of driven rollers, which are skewed relative to a longitudinal direction of travel, so that the parcels are conveyed not only in the longitudinal direction of travel, but also toward an inner wall (or product guide), which extends the length of the singulating system.

The exemplary singulating system also includes a third section comprised of a driven belt configured to convey parcels in the longitudinal direction of travel, along with a discharge chute.

Interposed between the first section and the third section is a second section, which conveys parcels from the first section to the third section, identifying and moving parcels in a side-by-side arrangement and/or parcels with an irregular shape.

In at least some embodiments, the exemplary singulating system also includes a visioning subsystem, with a camera that is positioned to acquire images of parcels as they move toward or into the second section. The camera is operably connected to a computer for receiving and processing the image data. The computer includes a processor for executing instructions (routines) stored in a memory component or other computer-readable medium to identify any parcels that are travelling in a side-by-side arrangement or have an irregular shape. Based on such analysis and the identification of any parcels that are travelling in a side-by-side arrangement or have an irregular shape, the computer communicates instructions to a motor control system.

Returning to the second section of the exemplary conveyor system, which conveys parcels from the first section to the third section, in some embodiments, the second section is comprised of: (i) multiple driven belts that are configured to convey parcels in the longitudinal direction of travel; and (ii) multiple series of selectively activated skew rollers. One of the driven belts is positioned adjacent to the inner wall, while the other driven belts are positioned between adjacent series of the selectively activated skew rollers. Once any side-by-side parcels are identified in the bulk flow of parcels approaching the second section, instructions are communicated to a motor control system to selectively activate one or more of the multiple series of skew rollers. A parcel that is travelling over one of the activated series of skew rollers is moved away from the inner wall, while still simultaneously being conveyed in the longitudinal direction of travel by one or more of the multiple driven belts. However, if a parcel is at least partially on the belt adjacent to the inner wall, the activation of one or more of the multiple series of skew rollers is not sufficient to overcome this frictional engagement. The "outside" parcel is thus moved away from the inner wall, while the "inside" parcel remains against the inner wall. As a result, when the parcels enter the third section of the singulating system, the inside parcel is conveyed through on the belt, while the outside parcel is discharged onto the discharge chute.

In an alternate configuration, the skew rollers remain activated and on until deactivated. This may be preferred when the goal is to identify parcels with an irregular shape (such as a non-rectangular box or an envelope) and ensure that they are passed through to the belt of the third section of the singulating system.

In some embodiments, the second section is comprised of a driven belt that is configured to convey parcels in the longitudinal direction of travel. Furthermore, the belt is an activated roller belt with integrated and selectively activated low-friction rollers (which can also be in the form of or characterized as balls). Once any side-by-side parcels are identified in the bulk flow of parcels approaching the second section, instructions are communicated to a motor control system to selectively activate selected sections (or zones) of the low-friction rollers of the belt. When the low-friction rollers in an outer zone of the belt are activated, a parcel that is travelling over the low-friction rollers is moved away from the inner wall, while still simultaneously being conveyed in the longitudinal direction of travel by the belt. However, if a parcel is at least partially on an inner zone of the belt (which is preferably a high-friction belt), the activation of the low-friction rollers in the outer zone of the belt is not sufficient to overcome this frictional engagement. Thus, when parcels are arranged side-by-side, the "outside" parcel is moved away from the inner wall, while the "inside" parcel remains against the inner wall. As a result, when the parcels enter the third section of the singulating system, the inside parcel is conveyed through on the belt, while the outside parcel is discharged onto the discharge chute.

In an alternate configuration, the skew rollers remain activated and on until deactivated. This may be preferred when the goal is to identify parcels with an irregular shape (such as a non-rectangular box or an envelope) and ensure that they are passed through to the belt of the third section of the singulating system.

In some embodiments, the second section is comprised of a driven belt that is configured to convey parcels in the longitudinal direction of travel. Furthermore, the belt is an activated roller belt with integrated and selectively activated high-friction rollers (which can also be in the form of or characterized as balls). Once any side-by-side parcels are identified in the bulk flow of parcels approaching the second section, instructions are communicated to a motor control system to selectively activate selected sections (or zones) of the high-friction rollers of the belt. When the high-friction rollers in an outer zone of the belt are activated, a parcel that is travelling over the high-friction rollers is moved away from the inner wall, while still simultaneously being conveyed in the longitudinal direction of travel by the belt. However, if a parcel is primarily on an inner zone of the belt, the activation of the high-friction rollers in the outer zone of the belt is not sufficient to overcome this frictional engagement. Thus, when parcels are arranged side-by-side, the "outside" parcel is moved away from the inner wall, while the "inside" parcel remains against the inner wall. As a result, when the parcels enter the third section of the singulating system, the inside parcel is conveyed through on the belt, while the outside parcel is discharged onto the discharge chute.

In some embodiments, the second section is comprised of a driven belt that is configured to convey parcels in the longitudinal direction of travel. Furthermore, the belt is an activated roller belt with integrated and selectively activated high-friction rollers (which can also be in the form of or characterized as balls). Additionally, the inner wall (or product guide) has an offset that corresponds with the transition from the first section to the second section. Once a parcel with an irregular shape is identified in the bulk flow of parcels approaching the second section, instructions are communicated to a motor control system to selectively activate selected sections (or zones) of the high-friction rollers of the belt. For instance, in some embodiments, the belt effectively includes an inner zone (adjacent to the inner wall), along with first and second outer zones (away from the inner wall). Because of the offset that corresponds with the transition from the first section to the second section, parcels are not initially positioned adjacent to the inner wall in the second section of the singulating system. Thus, in normal operation, the high-friction rollers of the inner zone of the belt are activated and remain activated to move parcels toward the inner wall in the second section, while still simultaneously conveying the parcels in the longitudinal direction of travel. At the same time, however, for any parcels that are significantly away from the inner wall and presumably "behind" another parcel in a side-by-side arrangement, the high-friction rollers of at least one of the outer zones of the belt are activated and remain activated to move parcels away from the inner wall in the second section, while still simultaneously conveying the parcels in the longitudinal direction of travel, for eventual discharge.

Additionally, in such embodiments, once a parcel with an irregular shape is identified in the bulk flow of parcels approaching the second section, instructions are communicated to the motor control system to selectively activate the rollers of one the outer zones of the belt to move parcels toward the inner wall in the second section (and into the inner zone) while still simultaneously conveying the parcels in the longitudinal direction of travel. At the same time, the rollers of the other outer zone of the belt are preferably deactivated while the parcel with the irregular shape passes through the second section to the third section of the singulating system.

In some embodiments, the second section is comprise of: a set of skew rollers that is configured to convey parcels in the longitudinal direction of travel and toward the inner wall; and an activated roller belt with integrated and selectively activated rollers (which can also be in the form of or characterized as balls), which are high-friction rollers. Once any side-by-side parcels are identified in the bulk flow of parcels approaching the second section, instructions are communicated to a motor control system to selectively activate selected sections (or zones) of the high-friction rollers of the belt. When the high-friction rollers in one or more outer zones of the belt are activated, a parcel that is travelling over the high-friction rollers is moved away from the inner wall, while still simultaneously being conveyed in the longitudinal direction of travel by the belt. However, if a parcel is primarily on the set of skew rollers, the activation of the high-friction rollers in one more outer zones of the belt is not sufficient to overcome this frictional engagement. Thus, when parcels are arranged side-by-side, the "outside" parcel is moved away from the inner wall, while the "inside" parcel remains against the inner wall. As a result, when the parcels enter the third section of the singulating system, the inside parcel is conveyed through on the belt, while the outside parcel is discharged onto the discharge chute.

DETAILED DESCRIPTION OF THE INVENTION

The present invention is a singulating system for parcels with a visioning subsystem that identifies parcels that are being conveyed in a side-by-side arrangement and/or parcels with an irregular shape.

Figure 1:
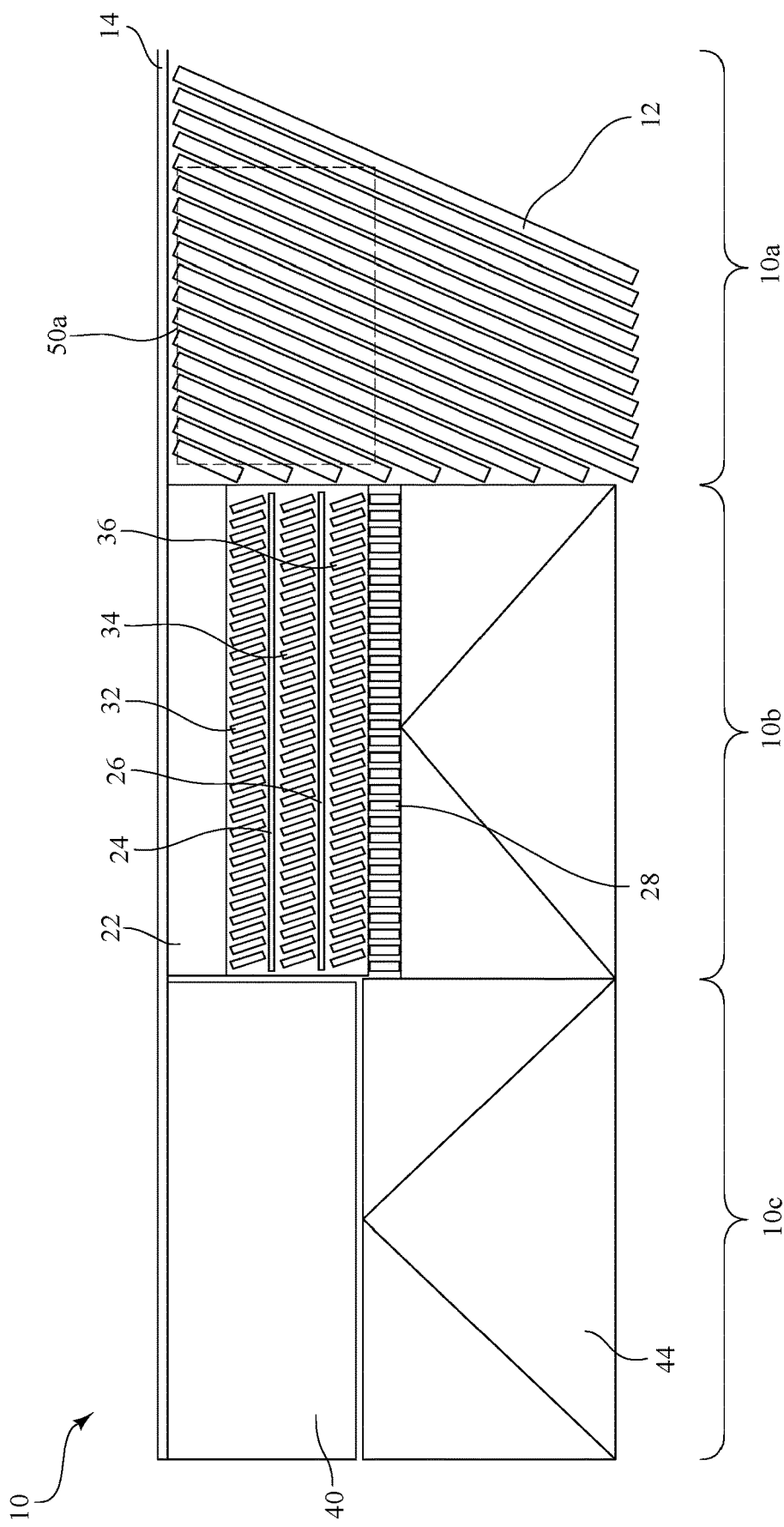
FIG. 1 is a schematic view of an exemplary parcel singulating system made in accordance with the present invention.
Figure 1A:
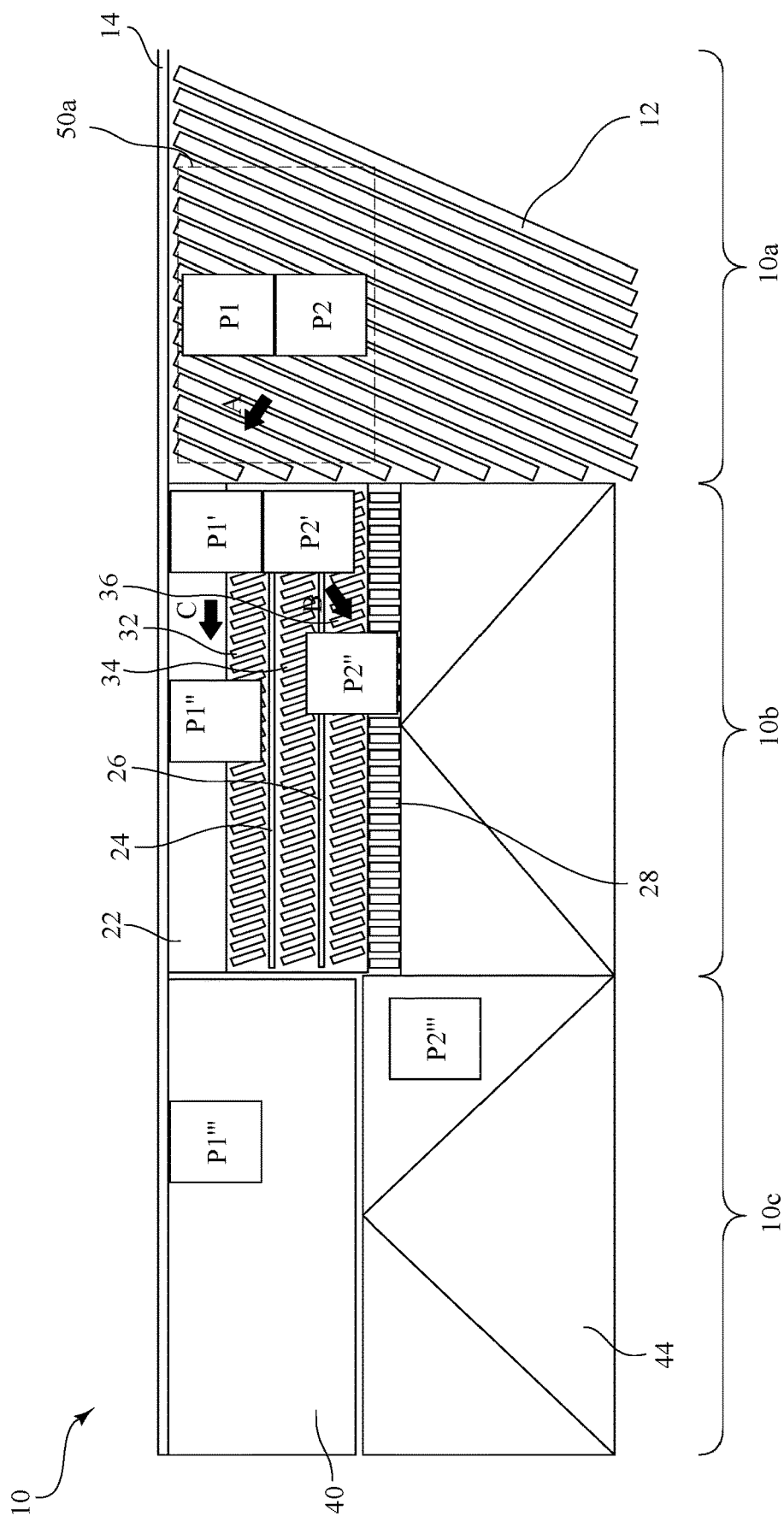
FIG. 1A is another schematic view of the exemplary parcel singulating system of FIG. 1, illustrating the conveyance of parcels via the parcel singulating system.

Referring now to FIGS. 1 and 1A, an exemplary singulating system 10 for parcels made in accordance with the present invention includes a first section 10a comprised of a series of driven rollers 12, which are skewed relative to a longitudinal direction of travel, so that the parcels are conveyed not only in the longitudinal direction of travel, but also toward an inner wall 14 (or product guide), as indicated by arrow A in FIG. 1A. In this regard, the inner wall 14 extends the length of the singulating system 10.

Referring still to FIGS. 1 and 1A, the exemplary singulating system 10 also includes a second section 10b that is comprised of: (i) multiple driven belts 22, 24, 26 that are configured to convey parcels in the longitudinal direction of travel; and (ii) multiple series of selectively activated skew rollers 32, 34, 36, the use of which is further described below. One of the driven belts 22 is positioned adjacent to the inner wall 14, while the other driven belts 24, 26 are positioned between adjacent series of the selectively activated skew rollers 32, 34, 36. As a further refinement, in this exemplary embodiment, the second section 10b also includes a series of outside rollers 28, which are also configured to convey parcels in the longitudinal direction of travel.

Referring still to FIGS. 1 and 1A, the exemplary singulating system 10 also includes a third section 10c comprised of a driven belt 40 configured to convey parcels in the longitudinal direction of travel, along with a discharge chute 44.

Figure 6:
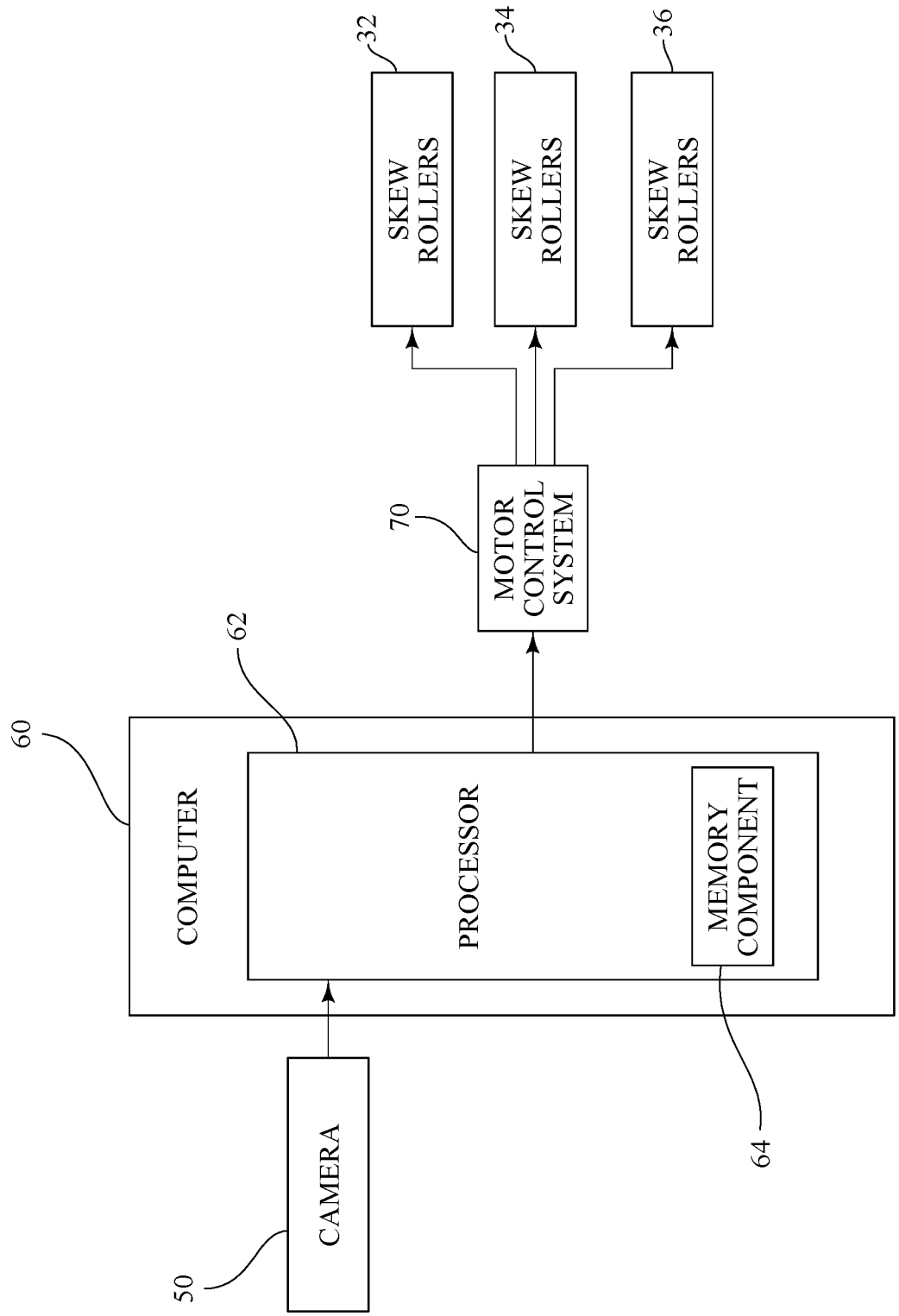
FIG. 6 is a schematic diagram of a visioning subsystem for use with the exemplary parcel singulating system of FIGS. 1 and 1A.

Referring still to FIGS. 1 and 1A, along with the schematic diagram of FIG. 6, a visioning subsystem includes a camera 50 (which is shown in FIG. 6 and may also be referred to as a vision sensor) that is positioned to acquire images of parcels as they move toward or into the second section 10b. Additionally, and as further discussed below, the camera 50 may be comprised of a single sensor or multiple sensors, and the camera 50 (or cameras) may be configured to acquire two-dimensional and/or three-dimensional image data either on command (for example, in response to electronic signal or similar trigger) or substantially continuously. In FIGS. 1 and 1A, the field of view of the camera 50 is indicated by a dashed box (labeled with reference number 50a) over the first section 10a of the singulating system 10. Although the field of view 50a is shown entirely over the first section 10a in this exemplary embodiment, it should be recognized that the field of view 50a could also extend into the second section 10b or even be entirely over the second section 10b, provided that the camera 50 can acquire images of parcels as they move toward or into the second section 10b. For example, suitable cameras for use in the present invention include three-dimensional image sensors manufactured and distributed by ifm Efector Inc. of Malvern, Pa. The camera 50 (or multiple cameras) is operably connected to a computer 60, which is another component of the visioning subsystem, for receiving and processing the image data. In this regard, the computer includes a processor 62 for executing instructions (routines) stored in a memory component 64 or other computer-readable medium. With respect to such processing of the image data, the computer 60 receives the image data from the camera 50, and then analyzes the image data to identify any parcels that are travelling adjacent to one another, i.e., are travelling in a side-by-side arrangement.

Figure 11:
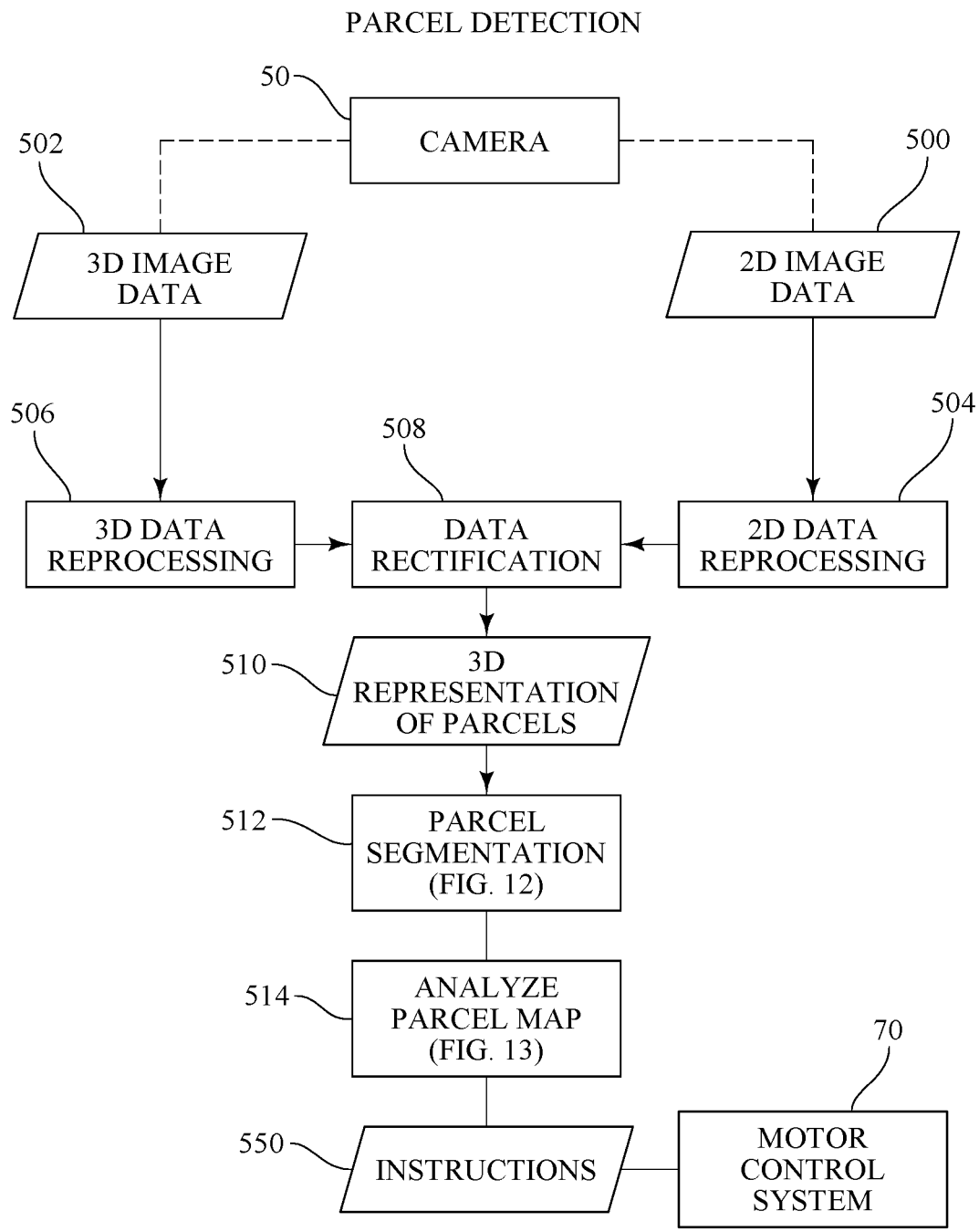
FIG. 11 is a flow chart of a "Parcel Detection" routine in one exemplary implementation.

While various forms of visioning subsystems and cameras could be used to identify parcels that are travelling in a side-by-side arrangement, FIG. 11 is a flow chart of a "Parcel Detection" routine in one exemplary implementation. As shown in FIG. 11, the image data from the camera 50 is used to generate a three-dimensional representation of the parcels. In this regard, and as shown in FIG. 11, the camera 50 may actually acquire two-dimensional image data of the parcels and three-dimensional image data (e.g., in point-cloud data format) of the parcels, as indicated by inputs 500, 502 in FIG. 11. The two-dimensional image data and the three-dimensional image data are then subjected to a pre-processing step in order, if necessary, to correct or modify raw data received from the camera 50, as indicated by blocks 504, 506 in FIG. 11. Additionally, if both two-dimensional data and three-dimensional data are acquired by the camera 50, there is an additional step of data rectification, in which the two-dimensional data and three-dimensional data are indexed or transformed to a common coordinate system, as indicated by block 508 in FIG. 11. The final result is a three-dimensional representation of the parcels, as indicated by output 510 in FIG. 11.

Referring still to FIG. 11, parcels are then identified and segmented from the three-dimensional representation, as indicated by block 512. In this regard, it is contemplated that various image analysis techniques, machine learning techniques, and/or artificial intelligence techniques could be used to carry out the identification and segmentation of parcels from the three-dimensional representation.

Figure 12:
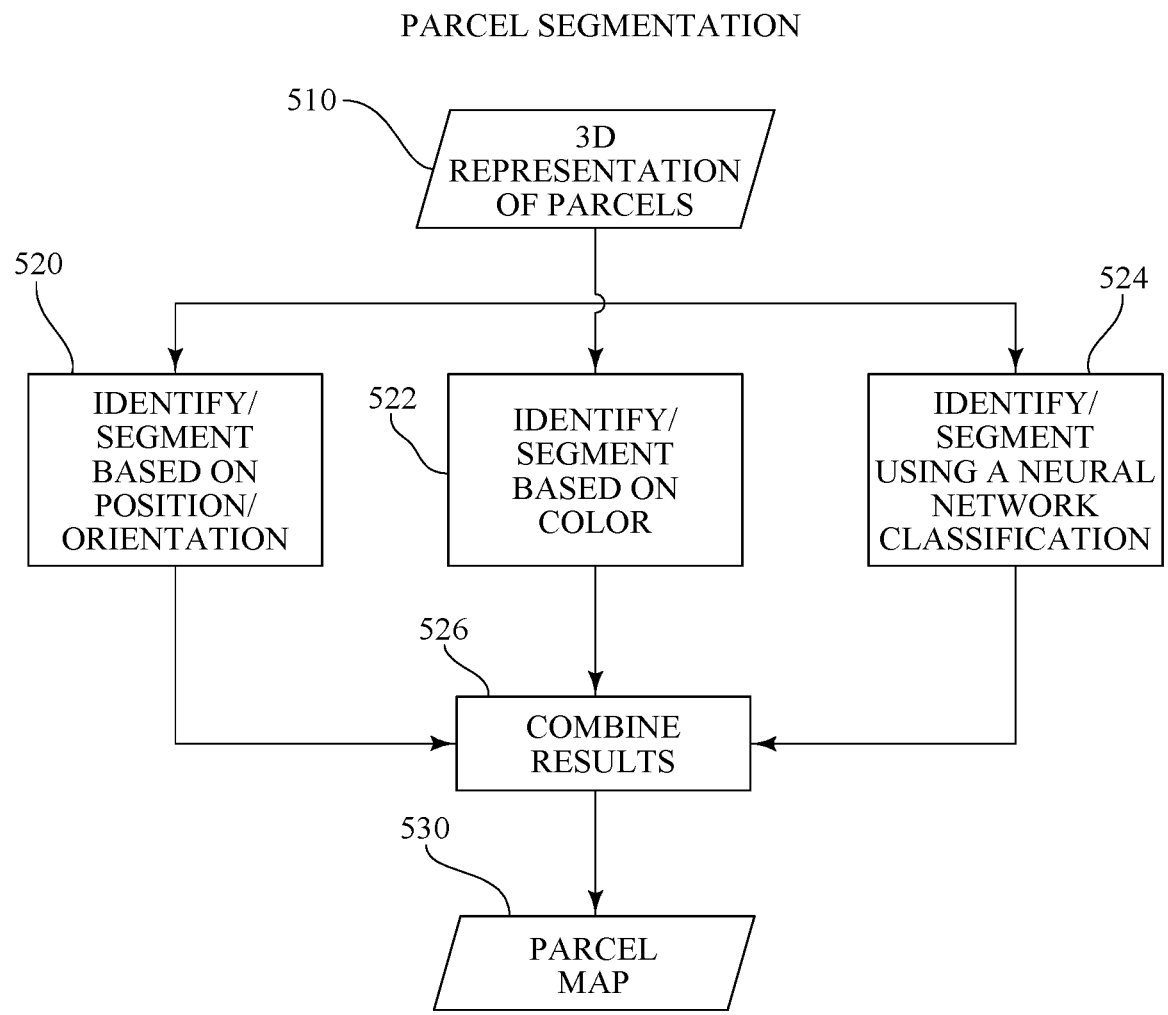
FIG. 12 is a flow chart of a "Parcel Segmentation" routine in one exemplary implementation.

Referring now to FIG. 12, in one exemplary implementation, a "Parcel Segmentation" routine includes multiple separate subroutines for analyzing the three-dimensional representation of the parcels. Specifically, as shown in FIG. 12, in one subroutine, parcels are identified and segmented based on their position and orientation (X, Y, Z coordinates) in the three-dimensional representation, as indicated by block 520 in FIG. 12. In another subroutine, parcels are identified and segmented based on analysis of color in the image data, as indicated by block 522 in FIG. 12. In another subroutine, parcels are identified and segmented using a neural network classification, as indicated by block 524 in FIG. 12. Finally, when multiple subroutines are used to analyze the three-dimensional representation of the parcels, the results are effectively combined, as indicated by output 526 in FIG. 12, to generate a parcel map, as indicated by output 530 in FIG. 12.

Referring again to FIG. 11, once the parcel map has been generated, the parcel map is analyzed to identify any parcels that are travelling adjacent to one another, i.e., are travelling in a side-by-side arrangement, as indicated by block 514. At the same time, the parcel map may also be analyzed to identify any parcels with an irregular shape, or even misaligned parcels.

Figure 13:
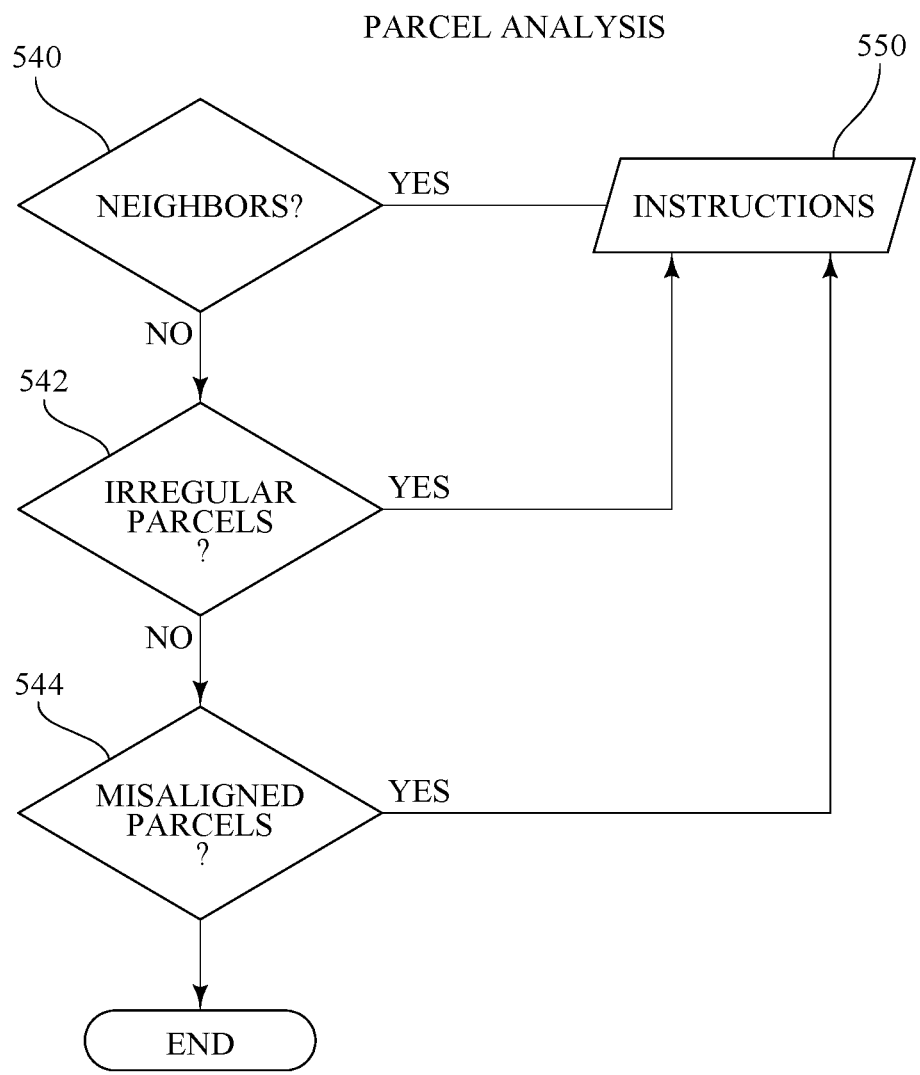
FIG. 13 is a flow chart of a "Parcel Analysis" routine in one exemplary implementation.

Referring now to FIG. 13, in one exemplary implementation, a "Parcel Analysis" routine includes multiple separate analysis subroutines. Specifically, as shown in FIG. 13, in one subroutine, a determination is first made as to whether a parcel has any neighbors travelling in a side-by-side arrangement, as indicated by decision 540 in FIG. 13. A determination is then made as to whether a parcel has an irregular shape, i.e., a shape that is outside of normal parameters, as indicated by decision 542 in FIG. 13. A determination is then made as to whether a parcel is misaligned, i.e., positioned on the conveyor in an unusual or unexpected manner, as indicated by decision 544 in FIG. 13.

Once the above-described routines have been carried out by the computer 60, and the parcels have been analyzed, the computer 60 communicates instructions to the motor control system 70 based on the analysis, as indicated by output 550 in FIGS. 11 and 13.

Again, as mentioned above, various forms of visioning subsystems and cameras could be used to identify parcels that are travelling in a side-by-side arrangement (or have an irregular shape or are misaligned) without departing from the spirit and scope of the present invention. FIGS. 11-13 are only intended to provide an example of a visioning subsystem.

Returning again to FIG. 1A, along with the schematic diagram of FIG. 6, once any side-by-side parcels are identified in the bulk flow of parcels approaching the second section 10b, the computer 60 communicates instructions to a motor control system 70 to selectively activate one or more of the multiple series of skew rollers 32, 34, 36. A parcel that is travelling over one of the activated series of skew rollers 32, 34, 36 is moved away from the inner wall 14 (or product guide), as indicated by arrow B in FIG. 1A, while still simultaneously being conveyed in the longitudinal direction of travel, as indicated by arrow C in FIG. 1A, by one or more of the multiple driven belts 22, 24, 26 and/or the outside rollers 28. However, if a parcel is at least partially on the belt 22 (which is preferably a high-friction belt), the activation of one or more of the multiple series of skew rollers 32, 34, 36 (which are preferably low-friction rollers) is not sufficient to overcome this frictional engagement. In other words, the belt 22 is constructed with a material with a higher coefficient of friction than the material of the skew rollers 32, 34, 36. For example, a typical high-friction belt might have a coefficient of friction in the range of 0.6 to 1.0, while typical low-friction rollers might have a coefficient of friction of about 0.3.

Referring still to FIG. 1A, when parcels are arranged side-by-side, the "outside" parcel (or P2) is moved away from the inner wall 14 and toward the series of outside rollers 28, while the "inside" parcel (or P1), which is engaged by the belt 22, remains against the inner wall 14. Again, the belt 22 is preferably a high-friction belt, and thus, the activation of one or more of the multiple series of skew rollers 32, 34, 36 (which are preferably low-friction rollers) is not sufficient to overcome this frictional engagement. As a result, when the parcels enter the third section 10c of the singulating system 10, the inside parcel (P1) is conveyed through on the belt 40, while the outside parcel (P2) is discharged onto the discharge chute 44. Although not shown in FIGS. 1 and 1A, most parcels that are discharged are placed on a recirculation conveyor (not shown) that returns those parcels to the first section 10a of the singulating system 10.

As described above, the system may be characterized as "normally skew off," as the skew rollers 32, 34, 36 are only activated when there is an identification of parcels that are travelling adjacent to one another, i.e., are travelling in a side-by-side arrangement. However, in an alternative configuration, the system may be characterized as "normally skew on," as the skew rollers 32, 34, 36 remain activated and on until deactivated. For instance, a "normally skew on" configuration may be preferred when the goal is to identify parcels with an irregular shape (such as a non-rectangular box or an envelope) and ensure that they are passed through to the belt 40 of the third section 10c of the singulating system. In the "normally skew on" configuration, any parcel that is at least partially on the belt 22 (which is preferably a high-friction belt) will remain against the inner wall 14 and will be passed through to the belt 40 of the third section 10c of the singulating system 10. However, for any parcels that have an irregular shape and do not engage the belt 22, it is necessary to turn off the skew rollers 32, 34, 36, so that the parcel can pass through the second section 10b to the third section 10c of the singulating system 10.

Thus, in the "normally skew on" arrangement, the camera 50 of the visioning subsystem is again positioned to acquire images of parcels as they move toward or into the second section 10b, but, in this case, the image data is analyzed to identify parcels with an irregular shape. Once any such parcels are identified in the bulk flow of parcels approaching the second section 10b, the computer 60 communicates instructions to the motor control system 70 to selectively deactivate the skew rollers 32, 34, 36.

Furthermore, with respect to the "normally skew on" configuration discussed above, it should be recognized that the camera 50 (or multiple cameras) can be positioned further upstream than as shown in FIG. 1 so that parcels with an irregular shape can be identified earlier.

Figure 2:
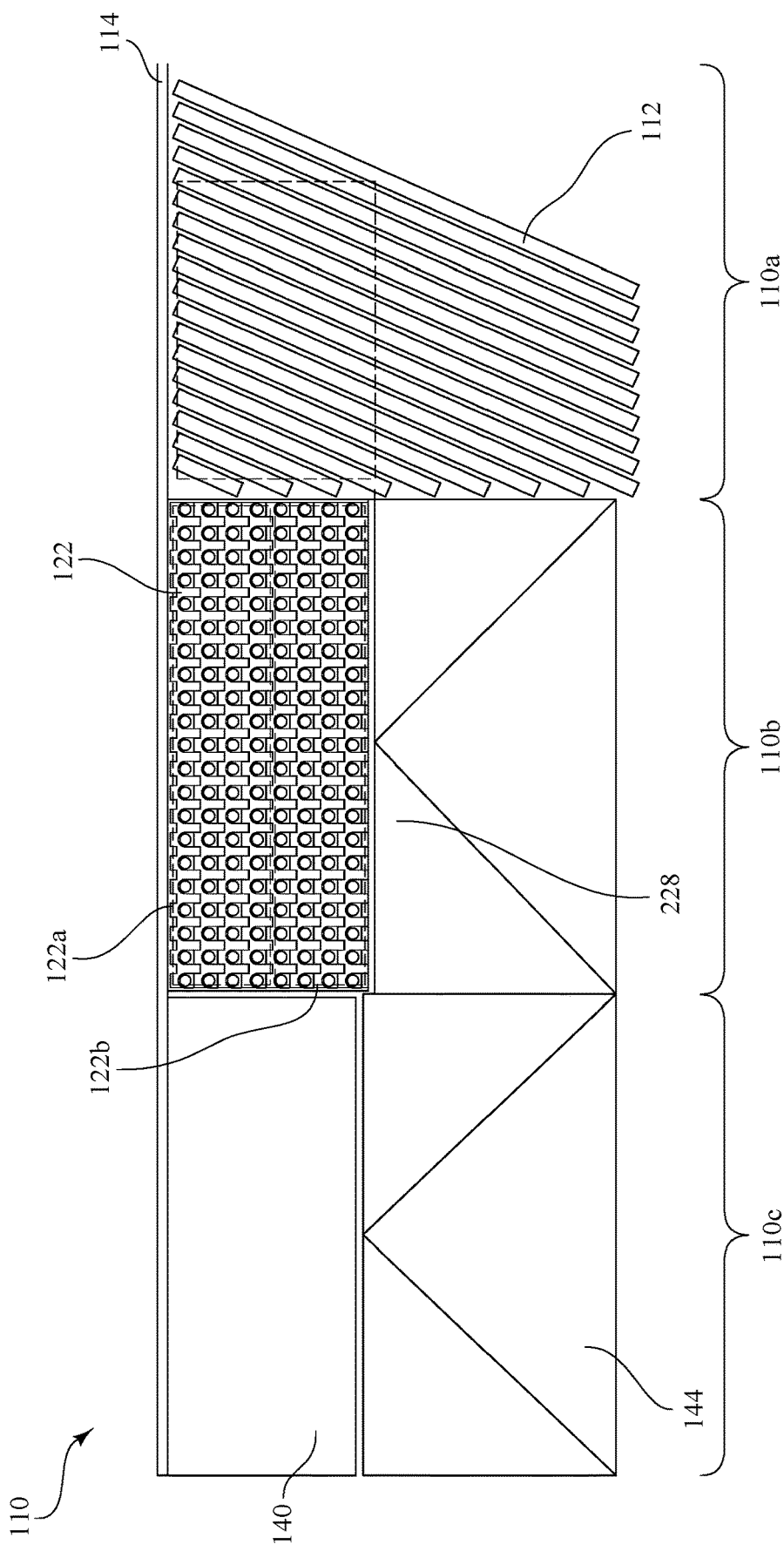
FIG. 2 is a schematic view of another exemplary parcel singulating system made in accordance with the present invention.

Referring now to FIG. 2, another exemplary singulating system 110 for parcels made in accordance with the present invention includes a first section 110a comprised of a series of driven rollers 112, which are skewed relative to a longitudinal direction of travel, so that the parcels are conveyed not only in the longitudinal direction of travel, but also toward an inner wall 114, which extends the length of the singulating system 110.

Referring still to FIG. 2, the exemplary singulating system 110 also includes a second section 110b comprised of a driven belt 122 that is configured to convey parcels in the longitudinal direction of travel. In this case, the belt 122 is an activated roller belt with integrated and selectively activated low-friction rollers (which can also be in the form of or characterized as balls), the use of which is further described below.

Referring still to FIG. 2, the exemplary singulating system 110 also includes a third section 110c comprised of a driven belt 140 configured to convey parcels in the longitudinal direction of travel, along with a discharge chute 144.

Figure 7:
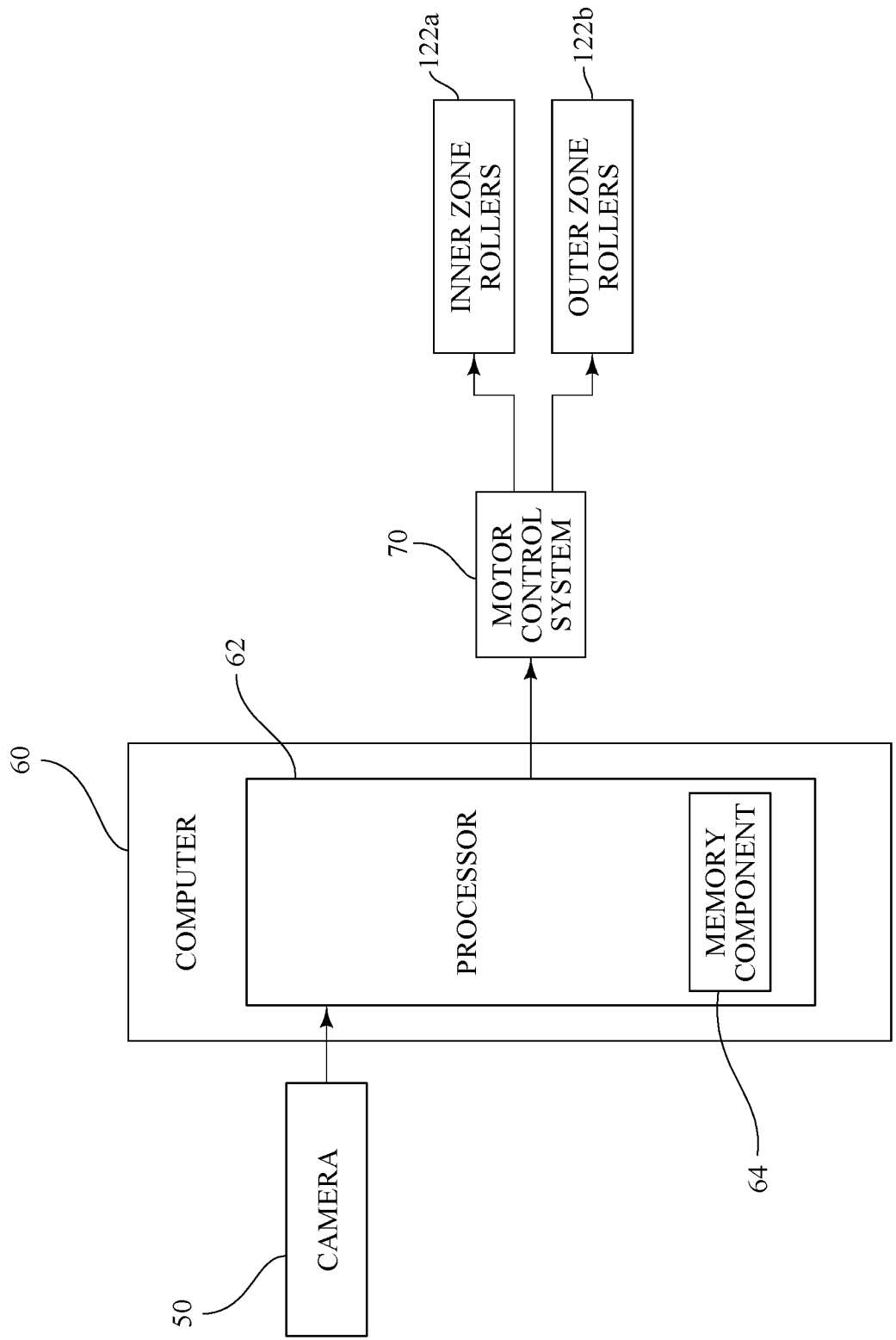
FIG. 7 is a schematic diagram of a visioning subsystem for use with the exemplary parcel singulating system of FIG. 2.

Referring still to FIG. 2, as with the exemplary embodiment described above with respect to FIG. 1, and as shown in the schematic diagram of FIG. 7, a visioning subsystem again includes a camera 50 that is positioned to acquire images of parcels as they move toward or into the second section 110b. In FIG. 2, the field of view of the camera 50 is indicated by a dashed box (labeled with reference number 50a) over the first section 110a of the singulating system 110. Although the field of view 50a is shown entirely over the first section 110a in this exemplary embodiment, it should be recognized that the field of view 50a could also extend into the second section 110b or even be entirely over the second section 110b, provided that the camera 50 can acquire images of parcels as they move toward or into the second section 110b.

Referring again to FIG. 7, the camera 50 is operably connected to a computer 60 for receiving and processing the image data. Again, the computer 60 includes a processor 62 for executing instructions (routines) stored in a memory component 64 or other computer-readable medium. With respect to such processing of the image data, the computer 60 receives the image data from the camera 50, and then analyzes the image data to identify any parcels that are travelling adjacent to one another, i.e., are travelling in a side-by-side arrangement, for example, in a manner similar to that described above with reference to FIGS. 11-13.

Once any side-by-side parcels are identified in the bulk flow of parcels approaching the second section 110b, the computer 60 communicates instructions to a motor control system 70 to selectively activate selected sections (or zones) of low-friction rollers of the belt 122. In the exemplary embodiment shown in FIGS. 2 and 7, the belt 122 effectively includes an inner zone 122a (adjacent to the inner wall 114) and an outer zone 122b (away from the inner wall 114). When the low-friction rollers in the outer zone 122b of the belt 122 are activated, a parcel that is travelling over the low-friction rollers is moved away from the inner wall 114, while still simultaneously being conveyed in the longitudinal direction of travel by the belt 122. However, if a parcel is at least partially on the inner zone 122a of the belt 122 (which is preferably a high-friction belt), the activation of the low-friction rollers in the outer zone 122b of the belt 122 is not sufficient to overcome this frictional engagement. Thus, when parcels are arranged side-by-side, the "outside" parcel is moved away from the inner wall 114, while the "inside" parcel remains against the inner wall 114. As a result, when the parcels enter the third section 110c of the singulating system 110, the inside parcel is conveyed through on the belt 140, while the outside parcel is discharged onto the discharge chute 144. Although not shown in FIG. 2, most parcels that are discharged are placed on a recirculation conveyor (not shown) that returns those parcels to the first section 110a of the singulating system 110.

As a further refinement, it should be recognized that selected sections (or zones) of low-friction rollers of the belt 122 could be activated sequentially or in other patterns to electively engage and move or manipulate identified parcels. Furthermore, additional cameras could be installed with a field of view in the second section 110b to confirm proper movement or manipulation of identified parcels.

As described above, the system may be characterized as "normally skew off," as the low-friction rollers of the belt 122 are only activated when there is an identification of parcels that are travelling adjacent to one another, i.e., are travelling in a side-by-side arrangement. However, in an alternative configuration, the system may be characterized as "normally skew on," as the low-friction rollers of the belt 122 remain activated and on until deactivated. As with the alternative embodiment described above with respect to FIG. 1, a "normally skew on" configuration may be preferred when the goal is to identify parcels with an irregular shape and ensure that they are passed through to the belt 140 of the third section 110c of the singulating system. However, for the "normally skew on" configuration, a high-friction belt (not shown) would have to be installed between the inner wall 114 and the belt 122 in the second section 110b of the singulating system 110.

Figure 3:
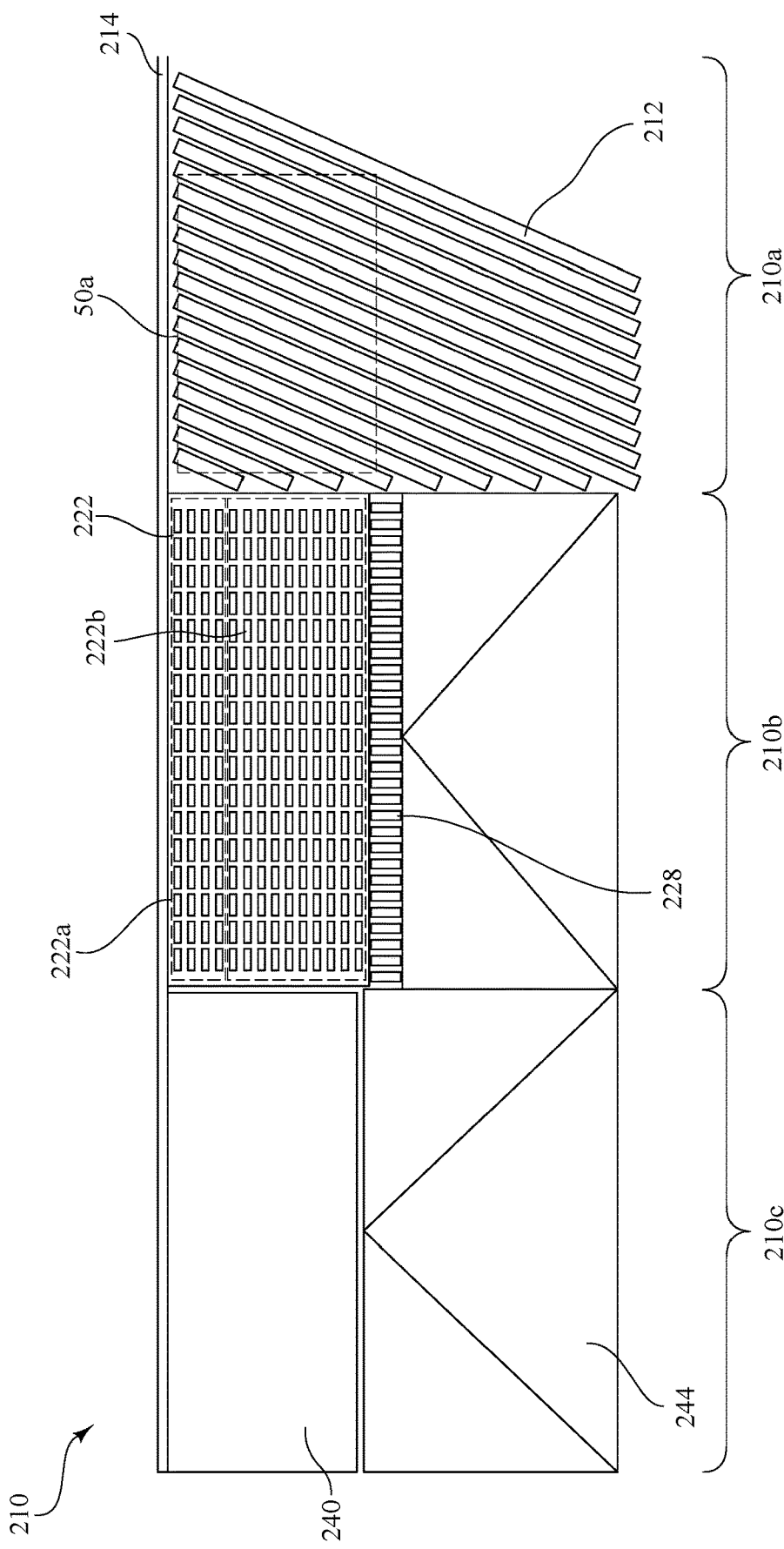
FIG. 3 is a schematic view of another exemplary parcel singulating system made in accordance with the present invention.

Referring now to FIG. 3, another exemplary singulating system 210 for parcels made in accordance with the present invention includes a first section 210a comprised of a series of driven rollers 212, which are skewed relative to a longitudinal direction of travel, so that the parcels are conveyed not only in the longitudinal direction of travel, but also toward an inner wall 214, which extends the length of the singulating system 210.

Similar to the exemplary embodiment described above with respect to FIG. 2, the exemplary singulating system 210 also includes a second section 210b comprised of a driven belt 222 that is configured to convey parcels in the longitudinal direction of travel. The belt 222 is an activated roller belt with integrated and selectively activated rollers (which can also be in the form of or characterized as balls), but unlike the exemplary embodiment described above with respect to FIG. 2, high-friction rollers are used, as further described below. For example, such high-friction rollers may have a coefficient of friction in the range of 0.6 to 1.0. Also, unlike the exemplary embodiment described above with respect to FIG. 2, the second section 210b also includes a series of outside rollers 228, which are also configured to convey parcels in the longitudinal direction of travel.

Referring still to FIG. 3, the exemplary singulating system 210 also includes a third section 210c comprised of a driven belt 240 configured to convey parcels in the longitudinal direction of travel, along with a discharge chute 244.

Figure 8:
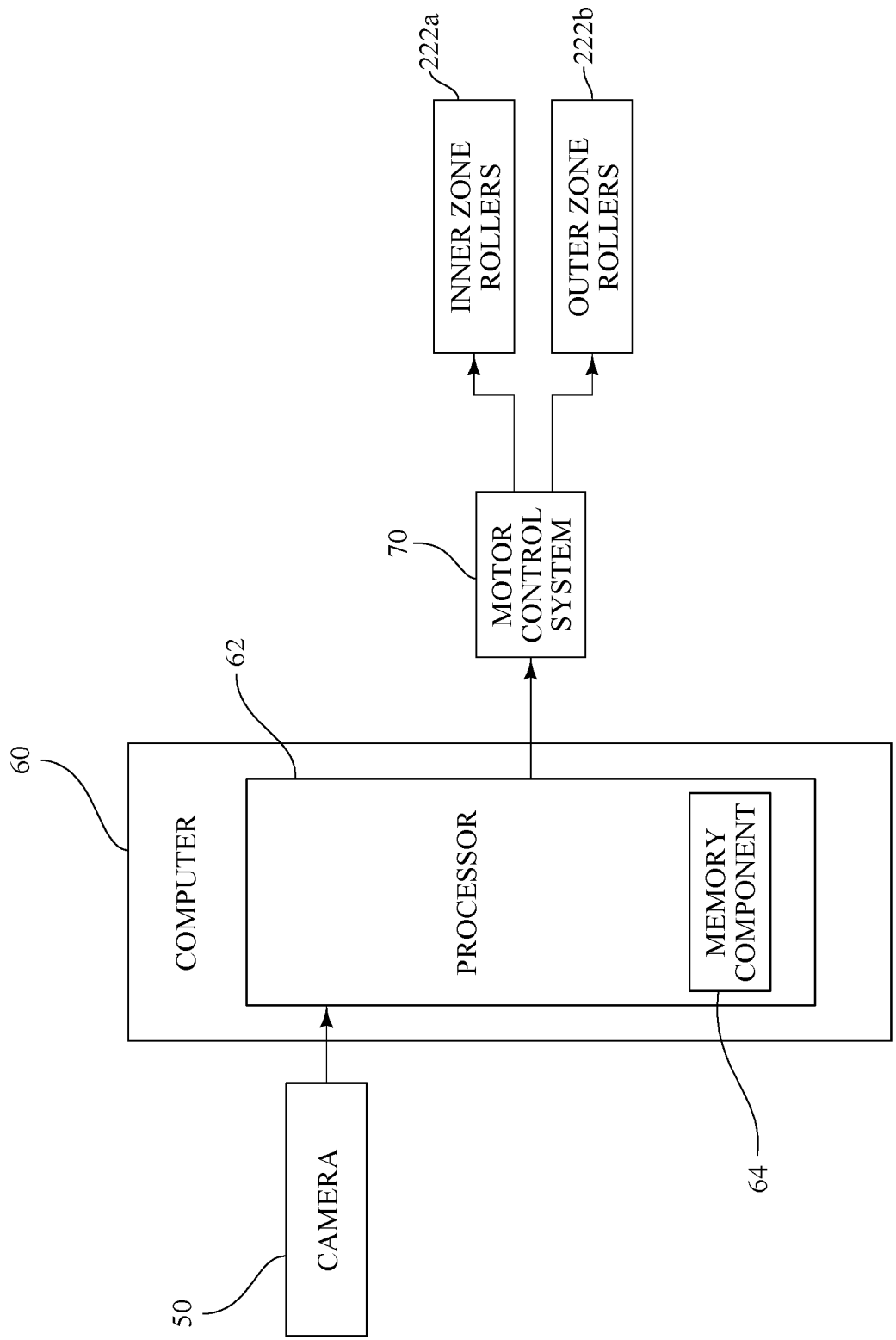
FIG. 8 is a schematic diagram of a visioning subsystem for use with the exemplary parcel singulating system of FIG. 3.

Referring still to FIG. 3, as with the exemplary embodiments described above with respect to FIGS. 1 and 2, and as shown in the schematic diagram of FIG. 8, a visioning subsystem again includes a camera 50 that is positioned to acquire images of parcels as they move toward or into the second section 210b. In FIG. 3, the field of view of the camera 50 is indicated by a dashed box (labeled with reference number 50a) over the first section 210a of the singulating system 210. Although the field of view 50a is shown entirely over the first section 210a in this exemplary embodiment, it should be recognized that the field of view 50a could also extend into the second section 210b or even be entirely over the second section 210b, provided that the camera 50 can acquire images of parcels as they move toward or into the second section 210b.

Referring again to FIG. 8, the camera 50 is operably connected to a computer 60 for receiving and processing the image data. Again, the computer 60 includes a processor 62 for executing instructions (routines) stored in a memory component 64 or other computer-readable medium. With respect to such processing of the image data, the computer 60 receives the image data from the camera 50, and then analyzes the image data to identify any parcels that are travelling adjacent to one another, i.e., are travelling in a side-by-side arrangement, for example, in a manner similar to that described above with reference to FIGS. 11-13.

Once any side-by-side parcels are identified in the bulk flow of parcels approaching the second section 210b, the computer 60 communicates instructions to a motor control system 70 to selectively activate selected sections (or zones) of high-friction rollers of the belt 222. In the exemplary embodiment shown in FIGS. 3 and 8, the belt 222 effectively includes an inner zone 222a (adjacent to the inner wall 214) and an outer zone 222b (away from the inner wall 214). When the high-friction rollers in the outer zone 222b of the belt 222 are activated, a parcel that is travelling over the high-friction rollers is moved away from the inner wall 214, while still simultaneously being conveyed in the longitudinal direction of travel by the belt 222. However, if a parcel is primarily on the inner zone 222a of the belt 222, the activation of the high-friction rollers in the outer zone 222b of the belt 222 is not sufficient to overcome this frictional engagement. Thus, when parcels are arranged side-by-side, the "outside" parcel is moved away from the inner wall 214, while the "inside" parcel remains against the inner wall 214. As a result, when the parcels enter the third section 210c of the singulating system 210, the "inside" parcel is conveyed through on the belt 240, while the "outside" parcel is discharged onto the discharge chute 244. Although not shown in FIG. 3, most parcels that are discharged are placed on a recirculation conveyor (not shown) that returns those parcels to the first section 210a of the singulating system 210.

Figure 4:
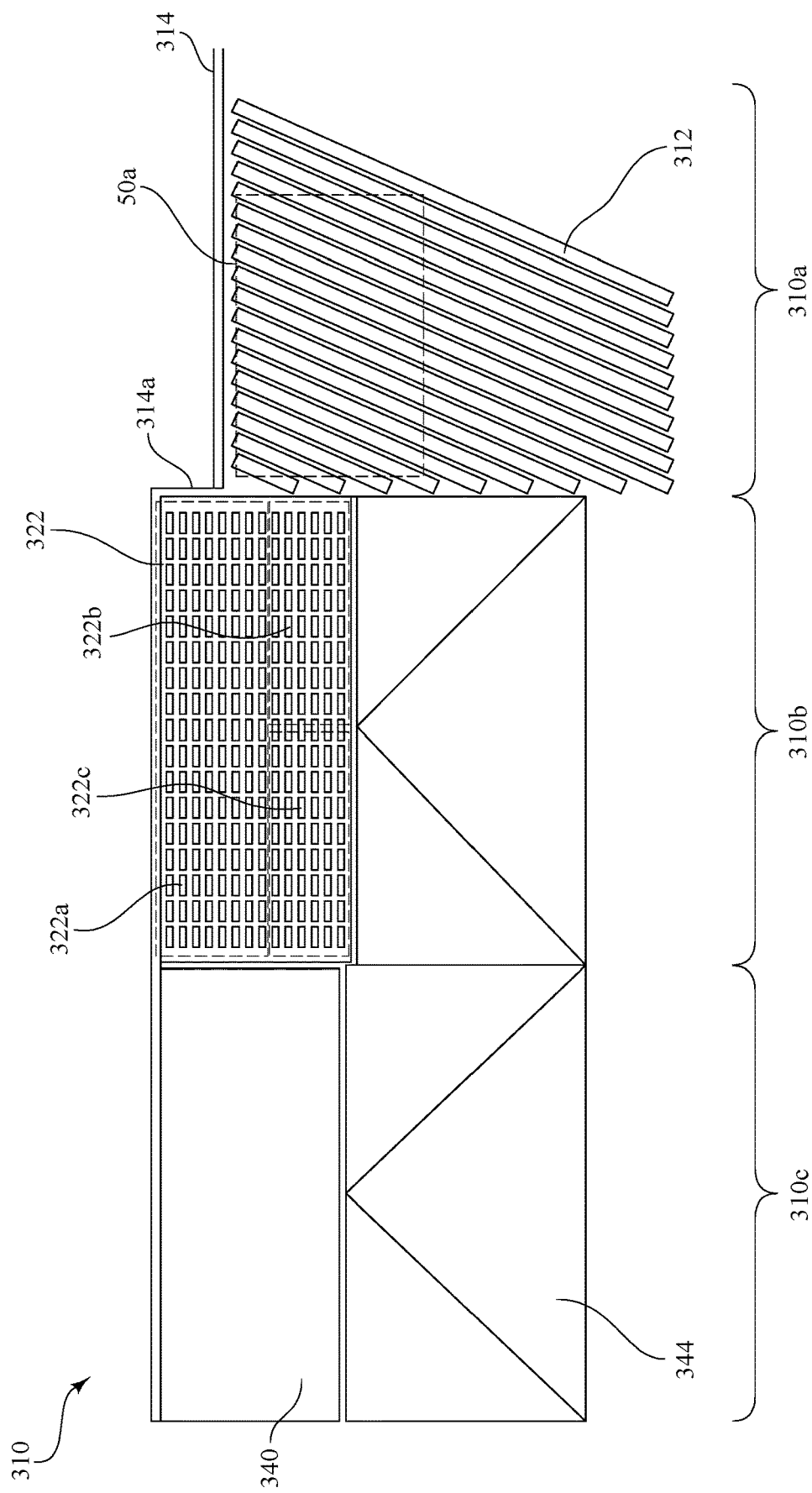
FIG. 4 is a schematic view of another exemplary parcel singulating system made in accordance with the present invention.

Referring now to FIG. 4, another exemplary singulating system 310 for parcels made in accordance with the present invention includes a first section 310a comprised of a series of driven rollers 312, which are skewed relative to a longitudinal direction of travel, so that the parcels are conveyed not only in the longitudinal direction of travel, but also toward an inner wall 314, which extends the length of the singulating system 310. Furthermore, in this exemplary embodiment, the inner wall 314 (or product guide) has an offset 314a that corresponds with the transition from the first section 310a to the second section 310b, as further described below.

Similar to the exemplary embodiment described above with respect to FIG. 3, the exemplary singulating system 310 also includes a second section 310b comprised of a driven belt 322 that is configured to convey parcels in the longitudinal direction of travel. The belt 322 is an activated roller belt with integrated and selectively activated rollers (which can also be in the form of or characterized as balls). Furthermore, like the exemplary embodiment described above with respect to FIG. 3, high-friction rollers are used. Again, for example, such high-friction rollers may have a coefficient of friction in the range of 0.6 to 1.0.

Referring still to FIG. 4, the exemplary singulating system 310 also includes a third section 310c comprised of a driven belt 340 configured to convey parcels in the longitudinal direction of travel, along with a discharge chute 344.

Figure 9:
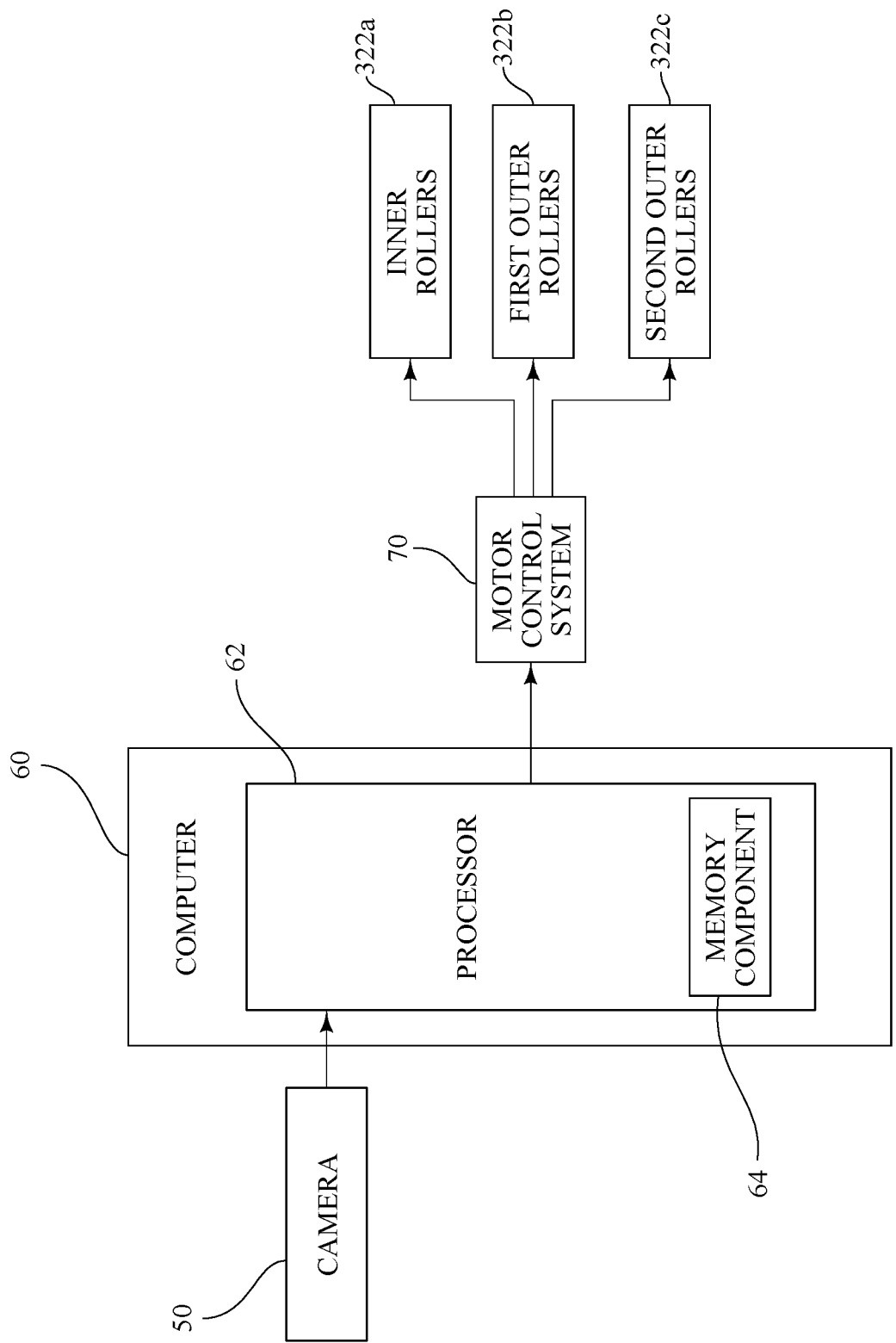
FIG. 9 is a schematic diagram of a visioning subsystem for use with the exemplary parcel singulating system of FIG. 4.

Referring still to FIG. 4, as with the exemplary embodiments described above with respect to FIGS. 1-3, and as shown in the schematic diagram of FIG. 9, a visioning subsystem again includes a camera 50 that is positioned to acquire images of parcels as they move toward or into the second section 310b. In FIG. 4, the field of view of the camera 50 is indicated by a dashed box (labeled with reference number 50a) over the first section 310a of the singulating system 310. Although the field of view 50a is shown entirely over the first section 310a in this exemplary embodiment, it should be recognized that the field of view 50a could also extend into the second section 310b or even be entirely over the second section 310b, provided that the camera 50 can acquire images of parcels as they move toward or into the second section 310b.

Referring again to FIG. 9, the camera 50 is operably connected to a computer 60 for receiving and processing the image data. Again, the computer 60 includes a processor 62 for executing instructions (routines) stored in a memory component 64 or other computer-readable medium. With respect to such processing of the image data, the computer 60 receives the image data from the camera 50, and then, in this case, analyzes the image data to identify parcels with an irregular shape, for example, in a manner similar to that described above with reference to FIGS. 11-13.

Once a parcel with an irregular shape is identified in the bulk flow of parcels approaching the second section 310b, the computer 60 communicates instructions to a motor control system 70 to selectively activate selected sections (or zones) of the high-friction rollers of the belt 322. In the exemplary embodiment shown in FIGS. 4 and 9, the belt 322 effectively includes an inner zone 322a (adjacent to the inner wall 314), along with first and second outer zones 322b, 322c (away from the inner wall 314). Because of the offset 314a that corresponds with the transition from the first section 310a to the second section 310b, parcels are not initially positioned adjacent to the inner wall 314 in the second section 310b of the singulating system 310. Thus, in normal operation, the high-friction rollers of the inner zone 322a of the belt 322 are activated and remain activated to move parcels toward the inner wall 314 in the second section 310b, while still simultaneously conveying the parcels in the longitudinal direction of travel. At the same time, however, for any parcels that are significantly away from the inner wall 314 and presumably "behind" another parcel in a side-by-side arrangement, the high-friction rollers of the second outer zone 322c of the belt 322 are activated and remain activated to move parcels away from the inner wall 314 in the second section 310b, while still simultaneously conveying the parcels in the longitudinal direction of travel, for eventual discharge.

Once a parcel with an irregular shape is identified in the bulk flow of parcels approaching the second section 310b, the computer 60 communicates instructions to selectively activate the rollers of the first outer zone 322b of the belt 322 to move parcels toward the inner wall 314 in the second section 310b (and into the inner zone 322a) while still simultaneously conveying the parcels in the longitudinal direction of travel. At the same time, the rollers of the second outer zone 322c of the belt 322 are preferably deactivated while the parcel with the irregular shape passes through the second section 310b to the third section 310c of the singulating system 310. Finally, and as with the other exemplary embodiments described above, when the parcels enter the third section 310c of the singulating system 310, any "inside" parcel is conveyed through on the belt 340, while any "outside" parcel is discharged onto the discharge chute 344. Although not shown in FIG. 4, most parcels that are discharged are placed on a recirculation conveyor (not shown) that returns those parcels to the first section 310a of the singulating system 310.

Figure 5:
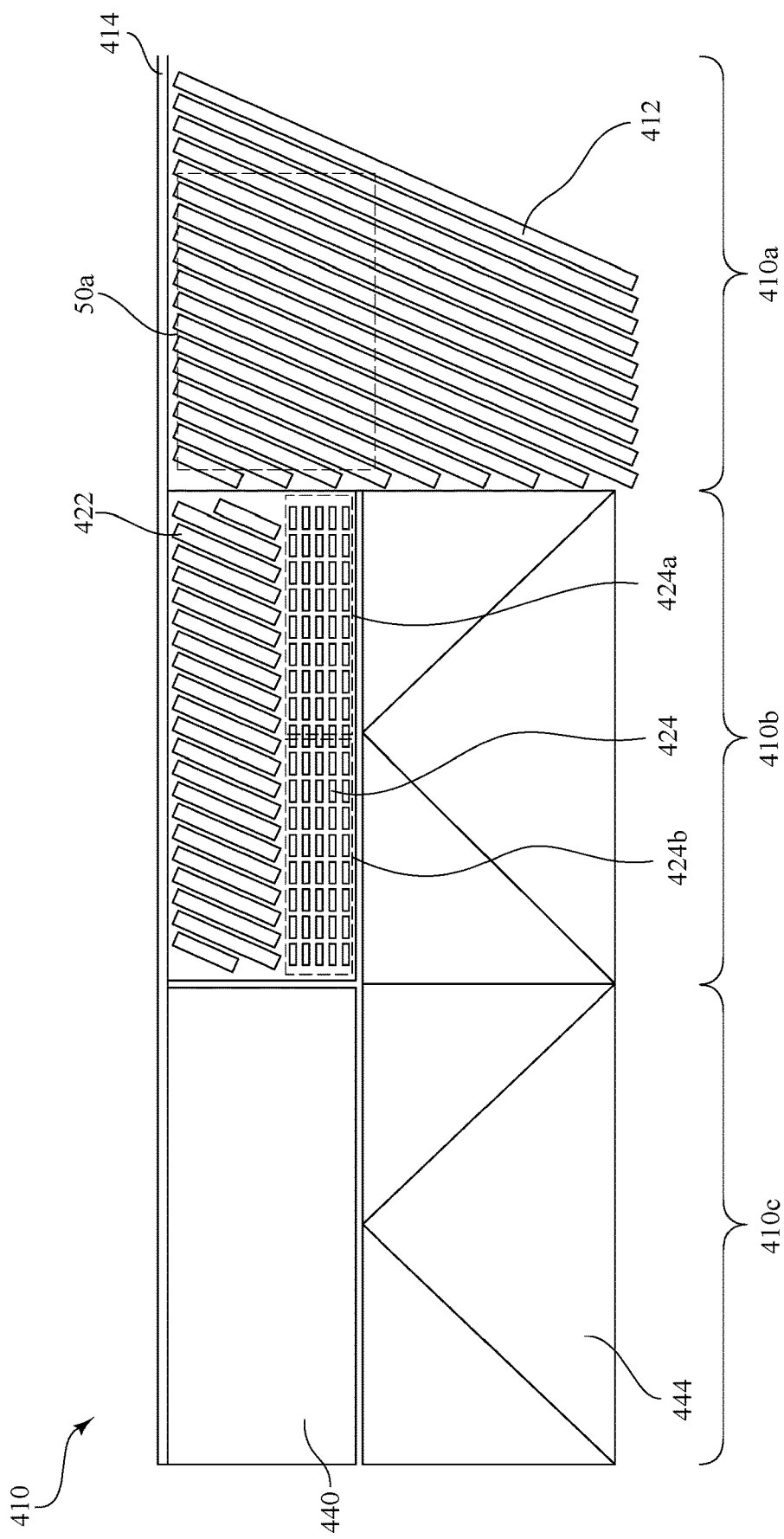
FIG. 5 is a schematic view of another exemplary parcel singulating system made in accordance with the present invention.

Referring now to FIG. 5, another exemplary singulating system 410 for parcels made in accordance with the present invention includes a first section 410a comprised of a series of driven rollers 412, which are skewed relative to a longitudinal direction of travel, so that the parcels are conveyed not only in the longitudinal direction of travel, but also toward an inner wall 414, which extends the length of the singulating system 410.

Referring still to FIG. 5, the exemplary singulating system 410 also includes a second section 410b comprised of: a set of skew rollers 422 that is configured to convey parcels in the longitudinal direction of travel and toward the inner wall 414; and an activated roller belt 424 with integrated and selectively activated rollers (which can also be in the form of or characterized as balls), which are high-friction rollers. Again, for example, such high-friction rollers may have a coefficient of friction in the range of 0.6 to 1.0.

Referring still to FIG. 5, the exemplary singulating system 410 also includes a third section 410c comprised of a driven belt 440 configured to convey parcels in the longitudinal direction of travel, along with a discharge chute 444.

Figure 10:
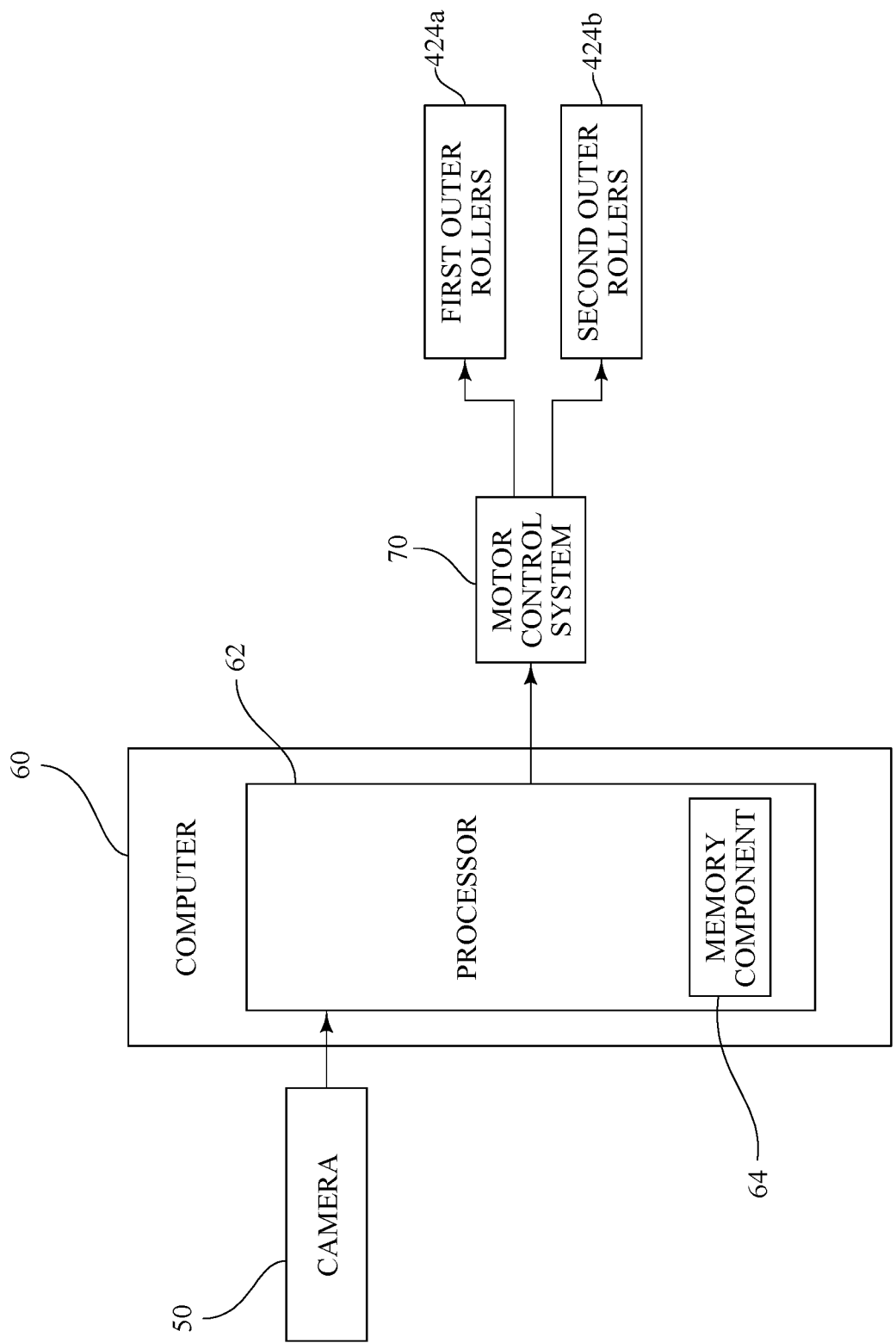
FIG. 10 is a schematic diagram of a visioning subsystem for use with the exemplary parcel singulating system of FIG. 5.

Referring still to FIG. 5, as with the exemplary embodiments described above with respect to FIGS. 1-4, and as shown in the schematic diagram of FIG. 10, a visioning subsystem again includes a camera 50 that is positioned to acquire images of parcels as they move toward or into the second section 410b. In FIG. 5, the field of view of the camera 50 is indicated by a dashed box (labeled with reference number 50a) over the first section 410a of the singulating system 210. Although the field of view 50a is shown entirely over the first section 210a in this exemplary embodiment, it should be recognized that the field of view 50a could also extend into the second section 410b or even be entirely over the second section 410b, provided that the camera 50 can acquire images of parcels as they move toward or into the second section 410b.

Referring again to FIG. 10, the camera 50 is operably connected to a computer 60 for receiving and processing the image data. Again, the computer 60 includes a processor 62 for executing instructions (routines) stored in a memory component 64 or other computer-readable medium. With respect to such processing of the image data, the computer 60 receives the image data from the camera 50, and then analyzes the image data to identify any parcels that are travelling adjacent to one another, i.e., are travelling in a side-by-side arrangement, for example, in a manner similar to that described above with reference to FIGS. 11-13.

Once any side-by-side parcels are identified in the bulk flow of parcels approaching the second section 410b, the computer 60 communicates instructions to a motor control system 70 to selectively activate selected sections (or zones) of high-friction rollers of the belt 424. In the exemplary embodiment shown in FIGS. 5 and 10, the belt 424 effectively includes a first outer zone 424a and a second outer zone 424b. When the high-friction rollers in one or both of first and second outer zones 424a, 424b of the belt 424 are activated, a parcel that is travelling over the high-friction rollers is moved away from the inner wall 414, while still simultaneously being conveyed in the longitudinal direction of travel by the belt 424. However, if a parcel is primarily on the set of skew rollers 422, the activation of the high-friction rollers in one or both of first and second outer zones 424a, 424b of the belt 424 is not sufficient to overcome this frictional engagement. Thus, when parcels are arranged side-by-side, the "outside" parcel is moved away from the inner wall 414, while the "inside" parcel remains against the inner wall 414. As a result, when the parcels enter the third section 410c of the singulating system 410, the "inside" parcel is conveyed through on the belt 440, while the "outside" parcel is discharged onto the discharge chute 444. Although not shown in FIG. 5, most parcels that are discharged are placed on a recirculation conveyor (not shown) that returns those parcels to the first section 410a of the singulating system 410.

One of ordinary skill in the art will recognize that additional embodiments and implementations are also possible without departing from the teachings of the present invention. This detailed description, and particularly the specific details of the exemplary embodiments and implementations disclosed therein, is given primarily for clarity of understanding, and no unnecessary limitations are to be understood therefrom, for modifications will become obvious to those skilled in the art upon reading this disclosure and may be made without departing from the spirit or scope of the invention.

What is claimed is:

1. A singulating system for parcels, comprising:
   an inner wall;
   a first section comprised of a series of driven rollers, which are skewed relative to a longitudinal direction of travel, so that the parcels are conveyed not only in the longitudinal direction of travel, but also toward the inner wall;
   a second section for receiving the parcels from the first section, wherein the second section includes (i) at least one driven belt that is configured to convey the parcels in the longitudinal direction of travel, and (ii) one or more series of selectively activated skew rollers for moving identified parcels toward or away from the inner wall;
   a third section for receiving the parcels from the second section; and
   a visioning subsystem, including
      a camera for acquiring image data of the parcels as the parcels move toward or into the second section, and
      a computer including a processor for executing instructions stored in a memory component to (i) receive and analyze the image data from the camera to identify parcels meeting predefined criteria, and (ii) communicate instructions to move identified parcels toward or away from the inner wall in the second section.

2. A singulating system for parcels, comprising:
   an inner wall;
   a first section comprised of a series of driven rollers, which are skewed relative to a longitudinal direction of travel, so that the parcels are conveyed not only in the longitudinal direction of travel, but also toward the inner wall;
   a second section for receiving the parcels from the first section, wherein the second section includes an activated roller belt that is configured to convey the parcels in the longitudinal direction of travel with integrated and selectively activated low-friction rollers for moving identified parcels toward or away from the inner wall;
   a third section for receiving the parcels from the second section; and
   a visioning subsystem, including
      a camera for acquiring image data of the parcels as the parcels move toward or into the second section, and
      a computer including a processor for executing instructions stored in a memory component to (i) receive and analyze the image data from the camera to identify parcels meeting predefined criteria, and (ii) communicate instructions to move identified parcels toward or away from the inner wall in the second section.

3. A singulating system for parcels, comprising:
   an inner wall;
   a first section comprised of a series of driven rollers, which are skewed relative to a longitudinal direction of travel, so that the parcels are conveyed not only in the longitudinal direction of travel, but also toward the inner wall;
   a second section for receiving the parcels from the first section, wherein the second section is comprised of an activated roller belt that is configured to convey the parcels in the longitudinal direction of travel with integrated and selectively activated high-friction rollers for moving identified parcels toward or away from the inner wall;
   a third section for receiving the parcels from the second section; and
   a visioning subsystem, including
      a camera for acquiring image data of the parcels as the parcels move toward or into the second section, and
      a computer including a processor for executing instructions stored in a memory component to (i) receive and analyze the image data from the camera to identify parcels meeting predefined criteria, and (ii) communicate instructions to move identified parcels toward or away from the inner wall in the second section.

4. A singulating system for parcels, comprising:
   an inner wall;
   a first section comprised of a series of driven rollers, which are skewed relative to a longitudinal direction of travel, so that the parcels are conveyed not only in the longitudinal direction of travel, but also toward the inner wall;

a second section for receiving the parcels from the first section, wherein the second section is comprised of (i) a set of skew rollers that is configured to convey the parcels in the longitudinal direction of travel and toward the inner wall, and (ii) an activated roller belt that is configured to convey the parcels in the longitudinal direction of travel with integrated and selectively activated high-friction rollers for moving identified parcels away from the set of skew rollers and the inner wall;

a third section for receiving the parcels from the second section; and a visioning subsystem, including
a camera for acquiring image data of the parcels as the parcels move toward or into the second section, and
a computer including a processor for executing instructions stored in a memory component to (i) receive and analyze the image data from the camera to identify parcels meeting predefined criteria, and (ii) communicate instructions to move identified parcels toward or away from the inner wall in the second section.

5. A singulating system for parcels, comprising:
an inner wall;
a first section comprised of a series of driven rollers, which are skewed relative to a longitudinal direction of travel, so that the parcels are conveyed not only in the longitudinal direction of travel, but also toward the inner wall;
a second section for receiving the parcels from the first section, including
at least one driven belt positioned adjacent to the inner wall and configured to convey the parcels in the longitudinal direction of travel, and
one or more series of selectively activated skew rollers; and
a third section for receiving the parcels from the second section, including
a driven belt configured to convey the parcels in the longitudinal direction of travel, and
a discharge chute;
wherein, at least one of the one or more series of selectively activated skew rollers of the second section is activated to move a selected parcel away from the inner wall, while the selected parcel is still conveyed in the longitudinal direction of travel through the second section, and then discharged onto the discharge chute in the third section.

6. The singulating system as recited in claim 5, and further comprising a visioning subsystem for acquiring and analyzing image data of the parcels as the parcels move toward or into the second section, and wherein the one or more series of selectively activated skew rollers of the second section is activated to move the selected parcel away from the inner wall in response to instructions received from the visioning subsystem.

7. The singulating system as recited in claim 5, wherein the second section includes multiple series of selectively activated skew rollers with one or more additional driven belts positioned between adjacent series of the selectively activated skew rollers.

8. The singulating system as recited in claim 5, wherein the second section also includes a series of outside rollers, which are also configured to convey the parcels in the longitudinal direction of travel.

9. A singulating system for parcels, comprising:
an inner wall;
a first section comprised of a series of driven rollers, which are skewed relative to a longitudinal direction of travel, so that the parcels are conveyed not only in the longitudinal direction of travel, but also toward the inner wall;
a second section for receiving the parcels from the first section, including an activated roller belt configured to convey the parcels in the longitudinal direction of travel and having integrated and selectively activated rollers configured to move selected parcels away from the inner wall; and
a third section for receiving the parcels from the second section, including
a driven belt configured to convey the parcels in the longitudinal direction of travel, and
a discharge chute;
wherein, at least some of the integrated and selectively activated rollers of the activated roller belt of the second section are activated to move a selected parcel away from the inner wall, while the selected parcel is still conveyed in the longitudinal direction of travel through the second section, and then discharged onto the discharge chute in the third section.

10. The singulating system as recited in claim 9, and further comprising a visioning subsystem for acquiring and analyzing image data of the parcels as the parcels move toward or into the second section, and wherein the at least some of the integrated and selectively activated rollers of the activated roller belt of the second section are activated to move the selected parcel away from the inner wall in response to instructions received from the visioning subsystem.

11. The singulating system as recited in claim 9, wherein the activated roller belt of the second section is composed of a high-friction belt with low-friction rollers.

12. The singulating system as recited in claim 9, wherein the activated roller belt of the second section includes an inner zone of rollers adjacent to the inner wall and an outer zone of rollers positioned away from the inner wall.

13. The singulating system as recited in claim 9, wherein the activated roller belt of the second section includes high-friction rollers.

14. The singulating system as recited in claim 13, wherein the activated roller belt of the second section includes an inner zone of rollers adjacent to the inner wall and an outer zone of rollers positioned away from the inner wall.

15. The singulating system as recited in claim 13, wherein the second section further includes a series of outside rollers, which are also configured to convey the parcels in the longitudinal direction of travel.

16. A singulating system for parcels, comprising:
an inner wall;
a first section comprised of a series of driven rollers, which are skewed relative to a longitudinal direction of travel, so that the parcels are conveyed not only in the longitudinal direction of travel, but also toward the inner wall;
a second section for receiving the parcels from the first section, including an activated roller belt configured to convey the parcels in the longitudinal direction of travel and having integrated and selectively activated rollers configured to move selected parcels away from the inner wall; and a third section for receiving the parcels from the second section, including
  a driven belt configured to convey the parcels in the longitudinal direction of travel, and
  a discharge chute;
wherein the inner wall has an offset that corresponds with a transition from the first section to the second section, such that the parcels are not positioned adjacent to the inner wall when the parcels enter the second section;
wherein the activated roller belt of the second section includes an inner zone of rollers adjacent to the inner wall, along with first and second outer zones of rollers positioned away from the inner wall;
wherein the inner zone of rollers are activated to convey the parcels toward the inner wall; and
wherein the rollers in one or both of the first and second outer zones are activated to move a selected parcel away from the inner wall, while the selected parcel is still conveyed in the longitudinal direction of travel through the second section, and then discharged onto the discharge chute in the third section.

17. The singulating system as recited in claim 16, and further comprising a visioning subsystem for acquiring and analyzing image data of the parcels as the parcels move toward or into the second section, and wherein the rollers in one or both of the first and second outer zones are activated to move the selected parcel away from the inner wall in response to instructions received from the visioning subsystem.

18. The singulating system as recited in claim 16, wherein the activated roller belt of the second section includes high-friction rollers.

19. A singulating system for parcels, comprising:
an inner wall;
a first section comprised of a series of driven rollers, which are skewed relative to a longitudinal direction of travel, so that the parcels are conveyed not only in the longitudinal direction of travel, but also toward the inner wall;
a second section for receiving the parcels from the first section, including a set of skew rollers that is configured to convey the parcels in the longitudinal direction of travel and toward the inner wall, and an activated roller belt that is configured to convey the parcels in the longitudinal direction of travel with integrated and selectively activated high-friction rollers for moving identified parcels away from the set of skew rollers and the inner wall;
a third section for receiving the parcels from the second section, including
  a driven belt configured to convey the parcels in the longitudinal direction of travel, and
  a discharge chute;
wherein, at least some of the integrated and selectively activated rollers of the activated roller belt of the second section are activated to move a selected parcel away from the set of skew rollers and the inner wall, while the selected parcel is still conveyed in the longitudinal direction of travel through the second section, and then discharged onto the discharge chute in the third section.

20. The singulating system as recited in claim 19, and further comprising a visioning subsystem for acquiring and analyzing image data of the parcels as the parcels move toward or into the second section, and wherein the at least some of the integrated and selectively activated rollers of the activated roller belt of the second section are activated to move the selected parcel away from the set of skew rollers and the inner wall in response to instructions received from the visioning subsystem.

* * * * *